US005705994A

United States Patent [19]

Nakayama et al.

[11] Patent Number: 5,705,994

[45] Date of Patent: Jan. 6, 1998

[54] RECEIVING APPARATUS

[75] Inventors: Toshiharu Nakayama, Ichikawa; Shigeo Sato, Funabashi, both of Japan

[73] Assignee: Uniden Corporation, Chiba, Japan

[21] Appl. No.: 423,623

[22] Filed: Apr. 17, 1995

[30] Foreign Application Priority Data

Mar. 24, 1995 [JP] Japan ............ 7-066333

[51] Int. Cl.[6] ............ G08B 5/22; H01Q 7/00; H04B 1/69

[52] U.S. Cl. ............ 340/825.44; 340/825.47; 379/57; 379/58; 370/342; 455/54.1

[58] Field of Search ............ 340/825.44, 825.47; 379/57, 59, 58; 370/18, 342; 455/54.1

[56] References Cited

U.S. PATENT DOCUMENTS

| | | | |
|---|---|---|---|
| Re. 33,417 | 10/1990 | Bhagat et al. | 379/57 |
| 5,258,751 | 11/1993 | DeLuca et al. | 340/825.44 |
| 5,309,154 | 5/1994 | Mun et al. | 340/825.44 |
| 5,387,904 | 2/1995 | Takada | 340/825.44 |
| 5,420,850 | 5/1995 | Umeda et al. | 370/18 |
| 5,463,383 | 10/1995 | Pache | 340/825.44 |

FOREIGN PATENT DOCUMENTS

| | | |
|---|---|---|
| 3-104363 | 5/1991 | Japan . |
| 4-138731 | 5/1992 | Japan . |

OTHER PUBLICATIONS

"Radio Handbook", 22d Ed. by William I. Orr (Howard W. Sams & Co., Inc.), pp. 24.16–24.31, 1981.

*Primary Examiner*—Michael Horabik
*Assistant Examiner*—Yonel Beaulieu
*Attorney, Agent, or Firm*—Lowe, Price, LeBlanc & Becker

[57] ABSTRACT

A receiving apparatus comprises a decoder for decoding a received signal, a memory for previously storing specified data, a correlator for obtaining correlation between a portion of or all of data stored in the memory and outputting data stored in the memory in descending order of correlation value, and a display unit for displaying output from said correlator. Hence, accurate reception of transmitted signals can be displayed, even if the receiver is located inconveniently to received waves, and error correction is inadequate.

18 Claims, 1 Drawing Sheet

RECEIVING APPARATUS

This patent application is the subject of a submission under the Disclosure Document Program, which was filed thereunder by applicants on Nov. 7, 1994 and identified as Disclosure Document No. 364623 with its accompanying fee paid under the provisions of all the Rules and Regulations including 37 CFR §1.21(c).

FIELD OF THE INVENTION

The present invention relates to a receiving apparatus which can obtain more certain received data even if an error or errors are included in the received data.

BACKGROUND OF THE INVENTION

In recent years, there has been distributed a radio calling system which calls a particular receiving terminal with a radio system from a radio base station by making use of a public telephone network. Although it is a one way message delivery system, the system has rapidly developed as a new communicating means enabling "whenever and wherever" which had been impossible with the ordinary telephone system, and especially, recently, services enabling transmission of simple messages and specification of a plurality of calling areas in addition to transmission of a calling sound have been distributed and diversified.

A portable terminal available for such services is called a radio caller/receiver, and is also called paging or a pager. In correspondence to contents of each service, there are various types of device such as one alerting the user not only with a calling sound but also with vibration, one displaying a figure or other display on a liquid crystal display screen, or that enabling recognition of a caller or a degree of emergency with two types of tone signal with two calling numbers assigned thereto respectively.

As representative communication systems, there are an NTT system using FSK (Frequency Shift Keying) modulation, POCSAG (Post Office Code Standardization Advisory Group), and the like. As a calling system, a calling signal is transmitted, when a call number is dialed, through the public telephone network via a local exchange to a radio calling central base station of a service provider connected therewith. In the central base station, the received call number is converted to data signal as a selected call number and transmitted as an electric wave from the central base station or a peripheral transmitting station (peripheral base station). A pager or the like with the call number assigned thereto receives this electric wave and is actuated.

However, in the receiving devices such as a pager as described above, a portion of digital data is disadvantageously lost at places inconvenient for receiving due to various causes such as fading during propagation through space, rainfall, attenuation of the electric wave in a subway or a building, or external disturbance by interference electric waves. For the reasons as described above, in the conventional type of receiving devices such as a pager, error correction is performed with BCH (Base Chaudhuri Hocquenghem) code.

However, in this type of error correction, error correction code is transmitted, detection and correction of an error are performed in the receiving side, and a substantial redundancy is required, so that the data transfer rate becomes substantially lower and the device becomes complicated. For this reason actually, for instance, in the POCSAG system, generally a signal comprises 21-bit data, 11-bit BCH, and a parity bit. In this case, error detection of up to 4 bits and error correction of up to 2 bits become possible. Thus, there are some limits in error correction with error correction code such as the BCH code described above, and data to be received is not always received completely.

SUMMARY OF THE INVENTION

It is an object of the present invention to provide a receiving apparatus which can receive data more certainly even if received data contains an error or errors.

In a receiving apparatus according to the present invention, a received signal is decoded by a decoder, correlation between a portion or all of specified data stored previously in a memory and a portion of or all the data decoded by the decoder is determined by a correlator, data stored in the memory is output in a descending order of correlation value and is displayed in a display unit.

With this feature, when receiving a signal at a place undesirable for receiving a signal, even if a portion of data is lost and the situation can not be overcome with error correction, more certain data can be obtained by previously storing candidates for received data and displaying for confirmation the candidates in a descending order of correlation with said stored data.

In a digital cordless telephone system according to the present invention, start and stop of the memory and correlator are controlled with a switch. With this feature, for instance, a specific facility according to the present invention can be used, for instance, only when the telephone is used at a place where receiving conditions are undesirable, and the facility is run only when required, so that electric power is not wasted and power consumption can be reduced.

In a digital cordless telephone system according to the present invention, data to be stored in the memory is telephone number with additional data appended to the telephone number, and correlation with a portion of a telephone number in said data is checked by a correlator. Especially, if the present invention is applied to a pager or the like, received data is a telephone number, and by previously storing a telephone number and, if possible, text data such as a name in the memory, and by displaying for checking received data in a descending order of correlation degree with the stored data, a more certain telephone number can be obtained even when receiving a signal at a place inconvenient for receiving signals.

Other objects and features of this invention will become understood from the following description with reference to the accompanying drawings.

DESCRIPTION OF THE PREFERRED EMBODIMENTS

Figure 1:
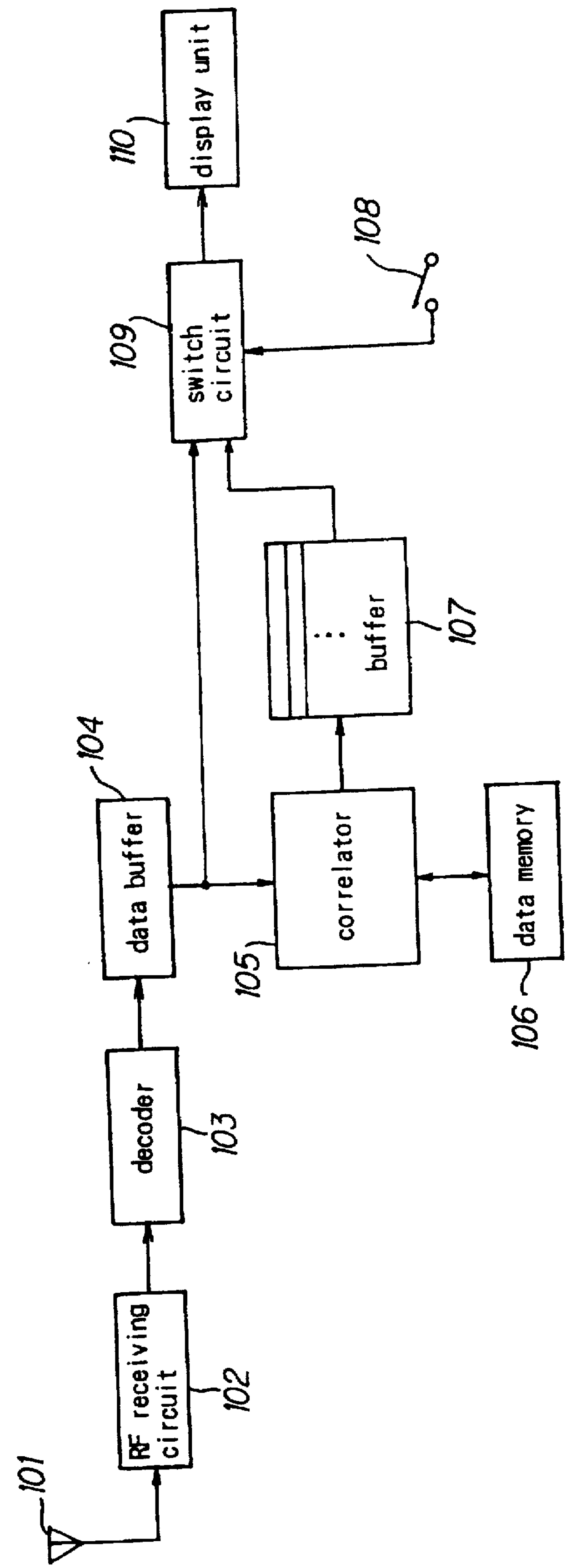
FIG. 1 is a block diagram showing a receiving apparatus (pager) according to one embodiment of the present invention.

Detailed description is made hereinafter for an embodiment of a receiving apparatus by using a pager which is a receiving means in a radio calling system as an example according to the present invention with reference to the related drawings.

FIG. 1 is a block diagram illustrating a pager according to one embodiment of the present invention. In this figure, the pager according to this embodiment comprises a receiving antenna 101, an RF receiving circuit 102, a decoder 103, a data buffer 104, a correlator 105, a data memory 106, a buffer 107, a switch 108, a switch circuit 109, and a display unit 110.

The decoder 103 executes decoding according to regulations in a network such as POCSAG or FLEX as described above. The data buffer 104 temporarily stores decoded data outputted from the decoder 103.

The data memory 106 is an electrically rewritable memory such as, for instance, an EEPROM, and telephone numbers and text data such as names relating to the telephone numbers are preset in the data memory 106.

It should be noted that a receiving apparatus in this embodiment is a pager, and in case of a pager, it rarely occurs to receive messages from many unspecific persons. Furthermore, the quantity of test data to be stored in a data memory 106 previously is small, so that the capacity of the data memory 106 to be prepared may be smaller and also the time required for presetting data in the data memory 106 may be shorter.

A correlator 105 detects correlation between decoded data temporarily stored in a data buffer 104 and data preset in the data memory 106, outputs data in descending order of correlation value to have the data temporarily stored in the buffer 107.

A method of obtaining a correlation value in the correlator 105 is, for instance, as follows. Namely, assuming that n-bit decoded data d obtained by decoding received data (a telephone number) is a data string of d0, d1, d2, . . . , dN−1 and also n-bit data p corresponding to a telephone number in the text data preset in the data memory 106 is a data string of p0, p1, p2, . . . , PN−1, the correlation value Cor can be obtained through the following equation:

$$Cor = 1 - \left( \sum_{i=0}^{N-1} di.xor.\ pi \right) / N \qquad (1)$$

".xor." in the second term in the equation (1) indicates an operator for exclusive logical sum, and for this reason the second term is obtained by computing an exclusive logical sum of decoded data di and preset data pi for each bit, counting a number of incoincident bits, and dividing the logical sum by the number of incoincident bits N. Namely, a value of the second term indicates a percentage of incoincident bits in n-bit data, and the correlation value Cor, which is a percentage of coincident bits in n-bit data, is obtained by subtracting a value of the second term from "1".

A switch 108 is a switch which can be set by a user, and is turned on for receiving signals at a place inconvenient for receiving signals. A switch circuit 109 is used for switching data to be displayed on a display unit 110 by turning ON/OFF the switch 108. When the switch 108 is ON, data is selectively outputted to the display unit 110 from the buffer 107. When the switch 108 is OFF, data is selectively outputted to the display unit 110 from the data buffer 104.

It should be noted that a telephone number and text data are displayed on the display unit 110 when the switch 108 is ON and only a telephone number displayed there when the switch 108 is OFF. As for the display when the switch 108 is ON, if only digits required for displaying a telephone number are prepared, the displayed text data may be scrolled by pressing, for instance, a right and left scroll button not shown herein.

Also, when the switch 108 is ON, at first data having the highest correlation value checked by the correlator 105 is outputted and displayed on the display unit 110. However, the displayed data may be scrolled in descending order of correlation value by pressing, for instance, an up and down scroll button.

Although not clearly shown in FIG. 1, the configuration is allowable in which operations of the correlator 105, data memory 106, and buffer 107 are started or stopped by turning ON/OFF the switch 108. Concretely the configuration is allowable in which, for instance, power supplied to these components is interrupted when the switch 108 is OFF. With this configuration, it is possible to set conditions so that the correlator 105, data memory 106, and buffer 107 are used only when used at a place inconvenient for receiving signals, and by making these components work only when required, it is possible to prevent power from being wasted and also to reduce power consumption.

Furthermore, in case of a pager, generally an error of up to 2 bits based on BCH code can be corrected in the decoder 103, and if more bits are lost, for instance, a particular code such as "_" is assigned for bits in the lost section. Hence, configuration is allowable in which the switch 108 is automatically turned ON using this function in case where a particular code is included in decode data, apart from a compulsory instruction by a user. With this feature, users are relieved of the troublesome operation of turning ON/OFF the switch 108 according to reception conditions.

With the configuration as described above, in the pager according to this embodiment, even if a portion of a received telephone number is lost and error correction based on BCH code can not be executed when receiving signals at a place not suited for receiving signals for such reasons as fading, rainfall, attenuation of electric waves due to such obstacles as buildings or the like, or interference by other electric waves, by previously storing telephone numbers and text data such as names in the data memory 106, it is possible to check received data by displaying text data stored in the data memory 106 and having high correlation with decoded data in descending order of correlation value. As a result, a more certain telephone number can be obtained.

As described above, with the receiving apparatus according to the present invention, a received signal is decoded by a decoder, correlation between a portion of or all the specified data previously stored in the memory and a portion of or all the data decoded by the decoder is obtained by a correlator, and correlation values of data stored in the memory are outputted in descending order of correlation value and displayed on a display unit. Thus, it is possible to provide a receiving apparatus which can obtain more certain received data, when receiving signals at a place not suited to receiving signals, even if a portion of data is lost and the situation can not be overcome by means of error correction, by displaying and checking data stored in the memory and having high correlation with decoded data in descending order of correlation value.

With the digital cordless telephone system according to the present invention, operations of the memory and correlator are started or stopped by turning ON/OFF a switch, so that the memory and correlator may be used, for instance, only when receiving signals at a place inconvenient for receiving signal, and thus power is not wasted and power consumption can be reduced by operating the means only when necessary.

Furthermore, with a digital cordless telephone system according to the present invention, data to be stored in the memory as telephone numbers and data related to the telephone numbers are used, and correlation with a portion of telephone numbers in the data is checked by the correlator. As a result, especially when the present invention is applied to a pager or the like, a more certain telephone number can be obtained, even when receiving signals at a place inconvenient for receiving signals, by displaying and checking data stored in the memory and having high correlation with a received telephone number in descending order of correlation value.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A receiving apparatus comprising:

a decoder for decoding a received radio signal;

a memory for previously storing specified data;

a correlator for obtaining correlation between a portion of or all of data decoded by said decoder and a portion of or all data stored in said memory and also for outputting data stored in said memory in descending order of correlation value;

a display unit for displaying output from said correlator, and a switch for controlling said display unit to display said output when conditions for reception of said radio signal are poor, and for controlling said display to display data of said received radio signal when conditions for reception of said radio signal are normal.

2. A receiving apparatus according to claim 1, wherein said receiving apparatus has a switch for starting or stopping operations of said memory and said correlator.

3. A receiving apparatus according to claim 1, wherein data stored in said memory is telephone numbers and data related to said telephone numbers and said correlator obtain correlation with a portion of telephone numbers in said data.

4. A receiving apparatus according to claim 2, wherein data stored in said memory is telephone numbers and data related to said telephone numbers and said correlator obtains correlation with a portion of telephone numbers in said data.

5. Apparatus for receiving a radio signal comprising:

an input circuit for detecting data in said received radio signal, a buffer memory for storing an initial sequence of the detected data, a reference memory for storing predetermined reference data, a correlator responsive to said buffer memory and said reference memory for generating a correlation signal indicating correlation between said detected data and said reference data, and for converting said initial sequence into an output sequence of the detected data in accordance with said correlation signal, an output circuit for outputting said output sequence of the detected data, and a switching circuit for enabling the output circuit to output the output sequence of the detected data when conditions for reception of the radio signal are poor, and to output the input sequence of the detected data when conditions for reception of the radio signal are normal.

6. The apparatus of claim 5, wherein said correlator reorders said initial sequence so as to arrange data elements of the detected data in an order of their correlation with the reference data.

7. The apparatus of claim 6, further comprising a buffer for storing the data elements of the output sequence.

8. The apparatus of claim 5, wherein said reference data comprises information about an anticipated sender of the received data.

9. The apparatus of claim 5, wherein said output circuit comprises a display for displaying the output sequence of the detected data.

10. The apparatus of claim 5, wherein said switching circuit is automatically activated to enable the output sequence to be output when a predetermined code is detected in said received signal.

11. A method of receiving a radio signal comprising the steps of:

decoding an incoming sequence of data elements in said radio signal, storing reference data, arranging said incoming sequence of the data elements in order of correlation of the data elements with said reference data to generate an output sequence of the data elements, and switching between a poor propagation mode of operation when conditions for reception of the radio signal are poor to output said output sequence of the data elements, and a normal propagation mode of operation when conditions for reception of the radio signal are normal to output said incoming sequence of the data elements.

12. The method of claim 11, wherein said step of switching is automatically carried out in response to a predetermined code in said signal.

13. A pager for receiving a comprising:

a decoder for generating an incoming sequence of data elements detected in said radio signal, a data memory for storing reference data representing anticipated telephone numbers, a correlation circuit for determining correlation between the data elements in said input sequence and the reference data to produce an output sequence of said data elements arranged in order of their degree of correlation with said reference data, an output circuit for outputting said output sequence of the data elements, and a control circuit for enabling said output circuit to output said output sequence of the data elements in response to a first predetermined condition, and for enabling said output circuit to output said incoming sequence of the data elements in response to a second predetermined condition.

14. The pager of claim 13, wherein said reference data further comprises anticipated data associated with said telephone numbers.

15. The pager of claim 13, wherein said output circuit comprises a display for displaying the data elements.

16. The pager of claim 13, wherein said control circuit is automatically activated in response to a control code in said radio signal.

17. The pager of claim 13, wherein said output circuit is controlled to output said output sequence of the data elements when conditions for propagation of said radio signal to said pager are poor.

18. The pager of claim 17, wherein said output circuit is controlled to output said incoming sequence of the data elements when conditions for propagation of said radio signal to said pager are normal.

* * * * *